May 29, 1956  H. W. BAKER, JR  2,747,551
ROTARY MOTOR AND PUMP

Filed July 24, 1952  5 Sheets-Sheet 1

INVENTOR.
HAROLD W. BAKER JR.
BY
ATTORNEYS

May 29, 1956 H. W. BAKER, JR 2,747,551
ROTARY MOTOR AND PUMP
Filed July 24, 1952 5 Sheets-Sheet 2

INVENTOR.
HAROLD W. BAKER JR.
BY Bresson Smith & Harding
ATTORNEYS

INVENTOR.
HAROLD W. BAKER JR.
BY Besser Smith + Hardy
ATTORNEYS

May 29, 1956  H. W. BAKER, JR  2,747,551
ROTARY MOTOR AND PUMP
Filed July 24, 1952  5 Sheets—Sheet 4

INVENTOR.
HAROLD W. BAKER JR.
BY
ATTORNEYS

May 29, 1956  H. W. BAKER, JR  2,747,551
ROTARY MOTOR AND PUMP
Filed July 24, 1952

INVENTOR.
HAROLD W. BAKER JR.
BY
Bresser Smith & Harly
ATTORNEYS

United States Patent Office 2,747,551
Patented May 29, 1956

2,747,551

ROTARY MOTOR AND PUMP

Harold W. Baker, Jr., Bryn Mawr, Pa.

Application July 24, 1952, Serial No. 300,727

5 Claims. (Cl. 121—93)

This invention relates to a rotary motor which is operated by a fluid. The motor of this invention can equally well be used to pump fluids.

An object of this invention is to provide a rotary fluid motor which is capable of operating at high speeds and providing a high torque.

A further object of this invention is to provide a rotary fluid motor operative with a minimum of moving parts.

A further object of this invention is to provide a rotary fluid motor having a minimum of friction losses.

An additional object of this invention is to provide a rotary fluid motor which will operate efficiently in either a clockwise or counterclockwise direction which can be readily reversed.

A still further object of this invention is to provide a rotary fluid motor which can be efficiently used as a pump when rotating either clockwise or counterclockwise.

An additional object of this invention is to provide a rotary motor which will operate at high speeds and high pressures.

An additional object of this invention is to provide a rotary pump which will operate at high speed and with relatively positive displacement.

An additional object of this invention is to provide a motor-pump which can be made in a wide variety of sizes with the large sizes requiring unusually small housings.

The motor or pump of this invention is operable with fluids which are either liquids or gases such as, for example, oil, water, air, or the like.

The motor or pump in accordance with this invention has a relatively simple housing within which is a single rotating disc which supports a plurality of impeller vanes. The impeller vanes are oscillated by means of a fixed cam so that they are held in a drive position as they move from the input zone to the discharge zone and then are partially rotated to pass through a restricted zone which isolates the input from the discharge zones.

A fuller understanding of the construction and elements may be had by reference to the drawings in which.

Figure 1:
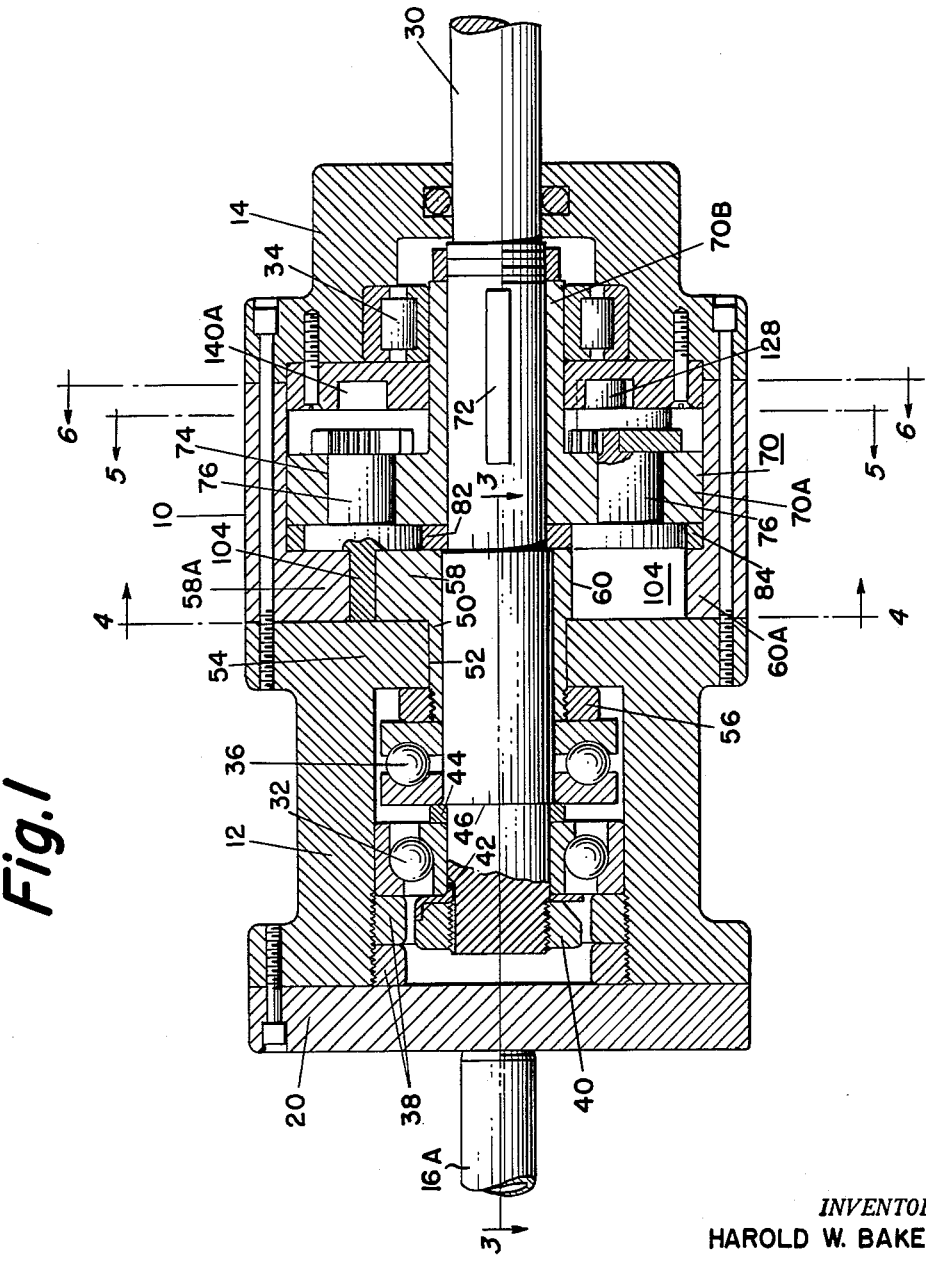
Figure 1 is a longitudinal cross-sectional view of the motor embodying the features of the present invention.

Referring particularly to Figure 1, there is shown one form of the invention wherein numeral 10 designates a rotor housing and numerals 12 and 14 designate bearing housings. The three members 10, 12 and 14 bolted together form the motor casing. Housing 12 includes the input and discharge ports 16 and 18 shown in Figure 3. Housing 12 has a cover plate 20.

The motor drives a rotor shaft 30. The rotor shaft 30 is supported by a ball bearing 32 in housing 12 and a roller bearing 34 in housing 14. A thrust bearing 36 in housing 12 supports the longitudinal forces on the rotor shaft 30 during operation of the motor.

The outer race of the ball bearing 32 is held in the housing 12 by means of a pair of externally threaded collars 38. The rotor shaft 30 is locked in place against the inner race of the ball bearing 32 by means of the nut 40 and lock washer 42. A small collar 44 separates the ball bearing 32 from the thrust bearing 36. This collar 44, abutting the shoulder 46 of rotor shaft 30, transmits the thrust of said rotor shaft to the bearing 36.

A tubular sleeve member 50 is fastened in opening 52 in wall 54 of the bearing housing 12. A nut 56 holds it in place and rotor shaft 30 passes through it. The end of the sleeve 50 which projects into the rotor housing 10 is provided with an enlarged segmental shaped part 58 which bears against the face of the wall 54 of bearing housing 12. A second segmental shaped portion 60 forms a shallow shoulder directly under the relatively larger part 58. The shape of this sleeve member 50 can best be seen by referring to Figure 2.

Figure 4:
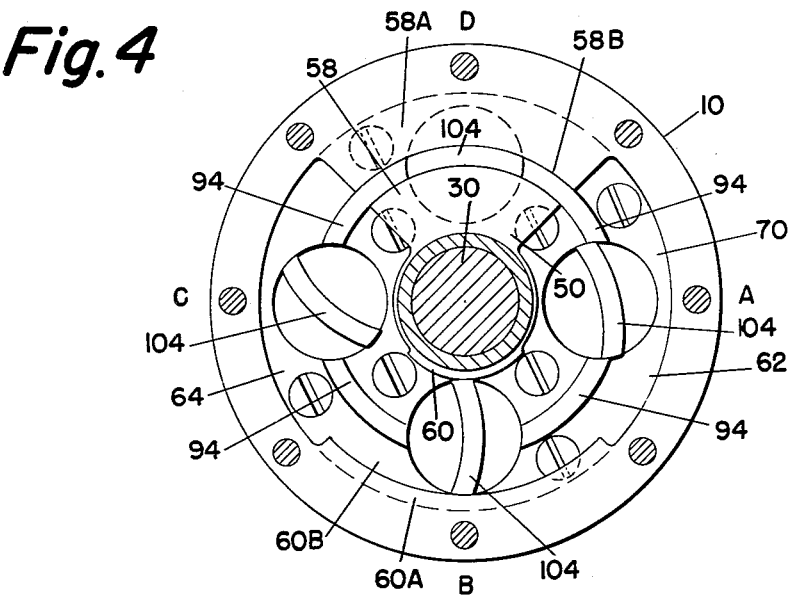
Figure 4 is a transverse cross-sectional view substantially on line 4—4 of Figure 1.

The rotor housing 10 is a tubular shaped member having a pair of radial inwardly projecting members 58A and 60A complementing the segmental members 58 and forming passageways 58B and 60B at the top and bottom of the rotor housing, as best seen in Figure 4, the remaining spaces 62 and 64 forming input and outlet chambers, respectively.

Referring again to Figure 1, a rotor 70 has a disc 70A at one end of a tubular sleeve 70B, which is keyed at 72 to the rotor shaft 30. Four openings 74 provide bearing for the rotatable impellers or blades 76. An additional four openings 78 (see Figure 2) provide bearing for the impeller oscillators 80.

Figure 2:
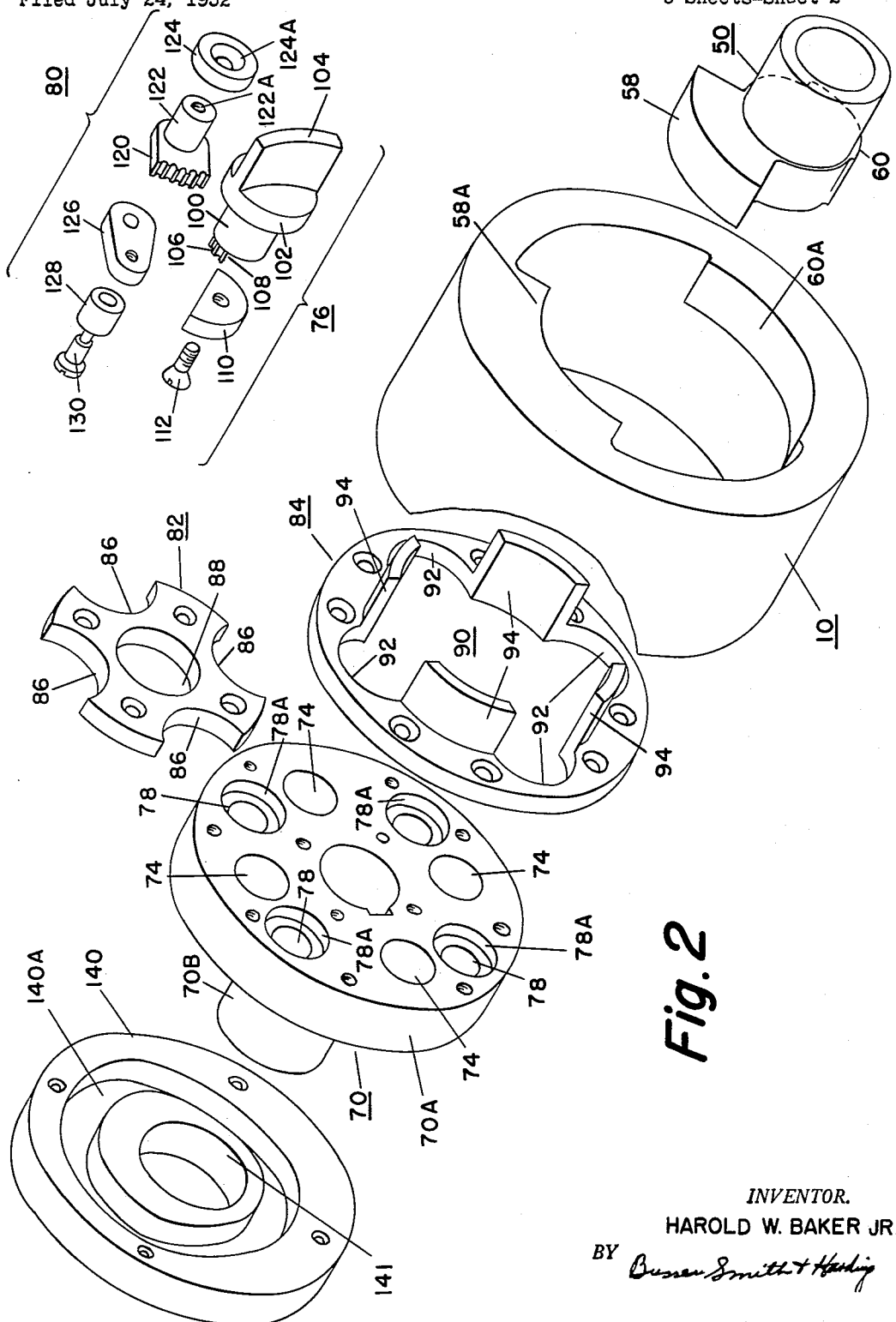
Figure 2 is an "exploded" perspective view of the principal elements of the motor.

Screw-fastened to the face of the rotor disc 70A are two members 82 and 84 as best seen in Figure 2. Member 82 is a circular disc having four substantially semicircular indents 86 equally spaced about its periphery. A central opening 88 is provided for the rotor shaft 30.

The member 84 is also a circular disc having a diameter equal to the rotor disc 70A. A circular central opening 90 is adapted to receive the circular disc member 82 and is provided with four equally spaced substantially semicircular indents 92 which complement the semicircular indents 86 of disc member 82.

The indents 92 of disc 84 and indents 86 of disc 82 combine to form circular counter bores about the openings 74 of rotor disc 70B.

Between the indents 92 of disc 84 on the periphery of the central circular opening 90 are arcuate flanges 94 which project forward longitudinally in the rotor housing 10. The proportions of the various elements are such that when the rotor 70 is revolving these longitudinal flanges or fins 94 pass snugly through the space formed between the inwardly projecting member 58A of rotor housing 10 and the segmental shaped part 58 of stationary sleeve member 50. The pass intermediate the similar projections 60A of housing 10 and 60 of sleeve 50.

Impeller blade assembly 76 illustrated in Figure 2 has a cylindrical member 100 adapted to fit rotatably in opening 74 of the rotor disc 70A. At one end is a concentric disc 102 of enlarged diameter which fits flush in the counter bore formed by the indents 86 and 92 of the members 82 and 84, respectively.

The impeller blades 104 are arcuate fins which project longitudinally forward in the rotor housing 10.

Blades 104 each include 45 degrees of arc. Blades 104 have substantially the same proportions as the members 94 but are preferably slightly narrower to provide a tolerance between blades 104 and passageway 58B. In the operation of the motor, however, they are not all simultaneously aligned, as will be hereinafter explained. It is important that the edges of blades 104 adjacent the periphery of discs 102 be diametrically opposed, that is, that the centers of the edges of each blade lie on a diameter line passing through the center of disc 102. As shown, the edges of each blade are ground cylindrically with the center of member 100 as a center.

At the opposite end of the impeller 76 a segment gear 106 is cut in the cylinder 100. A portion 108 of cylinder 100 is cut away so that something less than 180 degrees of arc are provided in the gear segment 106. The uncut cylinder occupies the full bore or opening 74 in rotor disc 70A and the segment gear projects beyond the rear face of said rotor disc 70A.

The impeller 76 is secured rotatably in said rotor disc 70A by means of a segmental disc 110 having somewhat more than 180 degrees of arc complementing the arcuate proportion of the segment gear 106. The radius of the segmental disc 110 is somewhat greater than the major radius of the segment gear 106, so that their projected or imaginary peripheries would form concentric circles.

A countersink head screw 112 secures said segmental disc 110 to the surface of step 108 in cylinder 100.

The radius of said disc 110 being greater than the radius of cylinder 100 and, therefore, greater than bore 74, the impeller is secured in rotor disc 70A.

The impeller oscillator 80 consists of a segment gear 120 having a stub shaft 122, which rotatably fits in an opening 78 of the rotor disc 70A. It is assembled from the rear of said disc 70A and a disc 124 which fits flush in the counter bore 78A of opening 78 secures said oscillator gear in the rotor disc 70A. A countersink head screw (not shown) fastens disc 124 to stub shaft 122 through countersunk hole 124A into tapped hole 122A.

The segment gear 120 is adapted to mesh with the segment gear 106 of the impeller 76 so that the rotation of said segment gear 120 causes rotational movement of said impeller 76.

The pitch diameter of segment gear 120 may be substantially larger than segment gear 106. For example, the ratio as shown might be 2:1 so that the impeller 76 is rotated twice as much as the impeller oscillator 80. A lever or crank arm 126 is secured to the rearward face of the segment gear 120 by any suitable means, such as countersink head screws 126A shown only in Figure 5. To the outer end of said crank arm 126 is rotatably mounted a cam follower roller 128 by means of a shouldered stud 130 shown in Figure 2.

As seen in the figures illustrating this embodiment, four such impellers 76 and their attendant oscillators 80 are provided, although various numbers of impellers can be utilized.

The cam follower rollers 128 project rearwardly from the motor 70 into an eccentric groove or track 140A of a cam disc 140. Said cam disc is stationary and is secured by any suitable means, such as screws, to the interior of the bearing housing 14 in front of the roller bearing 34.

Figure 6:
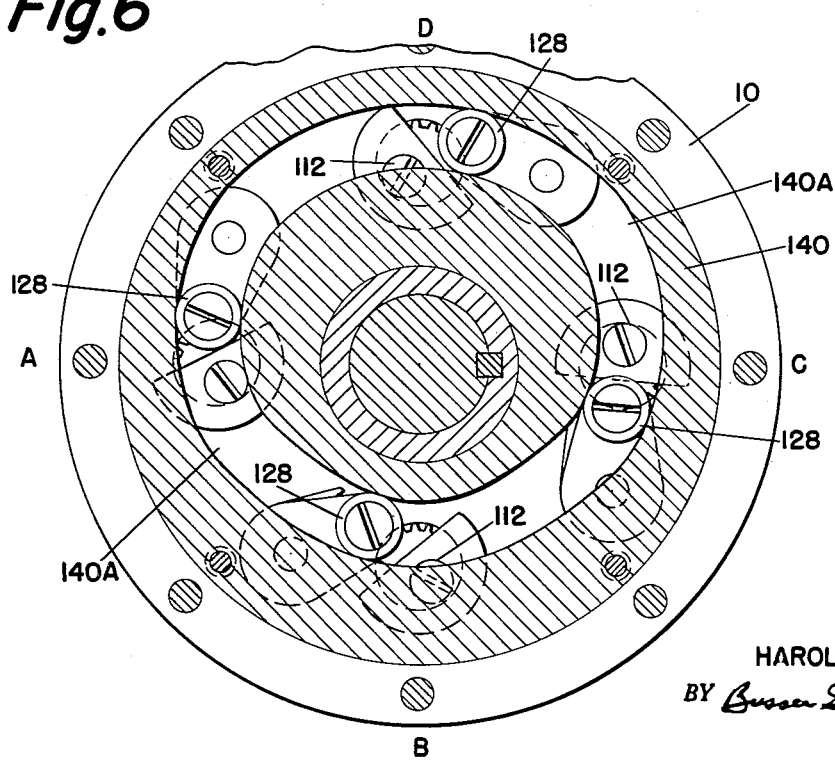
Figure 6 is a transverse cross-sectional view substantially on line 6—6 of Figure 1 illustrating the cam which oscillates the impeller blades.
Figure 7:
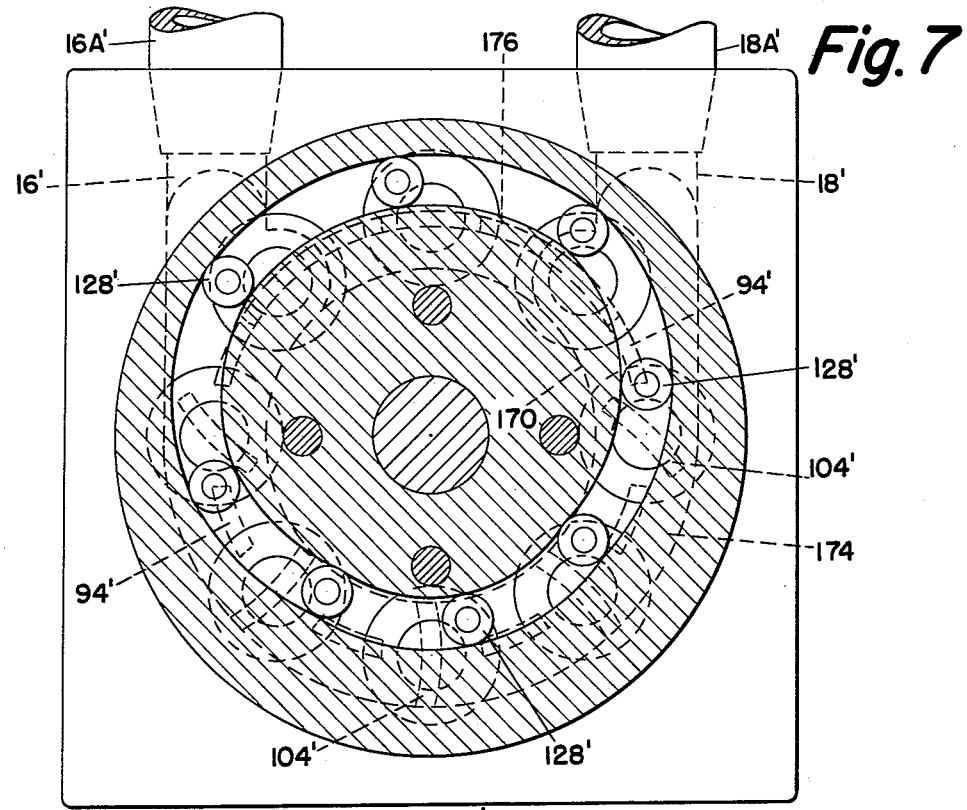
Figure 7 is a transverse cross-sectional view substantially on line 7—7 of Figure 8 illustrating a modified version of the invention.

As shown in Figure 7 the zero point of the cam is on the center line which causes the action of the impellers to be slightly unsymmetrical with respect to each other. This is compensated for by the motor tolerances and, if desired, can be eliminated by indexing cam disc 140 about 5° clockwise as viewed in Figure 6.

It will be noted that impeller blade assembly cylindrical member 100 in opening 74 takes most of the force exerted on the impeller blade and the cam follower rollers 128 are subjected only to the force necessary to turn the impeller blade.

Figure 3:
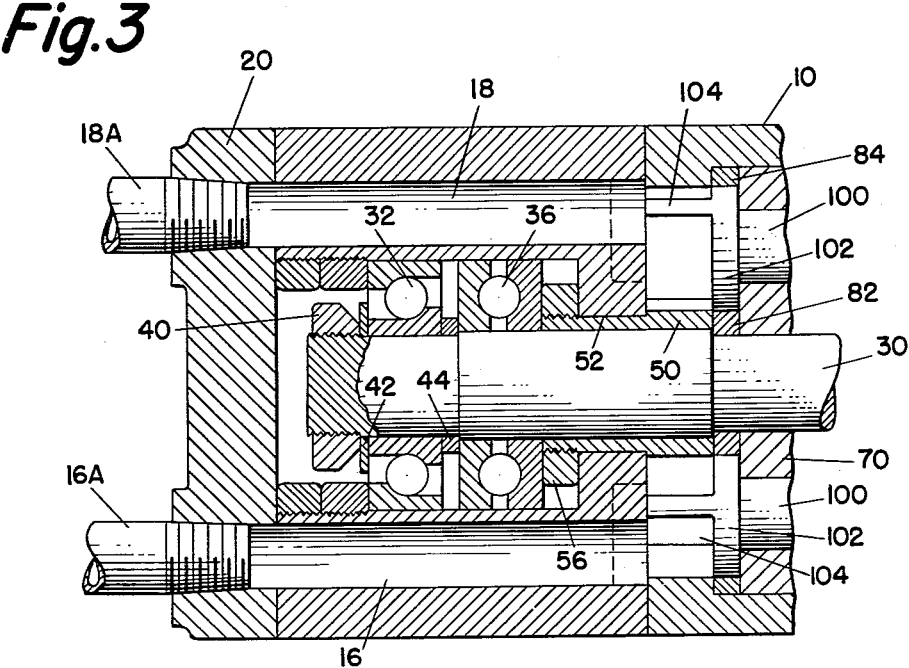
Figure 3 is a fragmentary cross-sectional view taken substantially on the line 3—3 of Figure 1.

Now referring to Figures 3 and 4, it will be seen that a pair of cored ports 16 and 18 are provided in the bearing housing 12, which communicate with the input and outlet chambers 62 and 64 in the rotor housing 10. Ports 16 and 18 align with threaded openings in the cover plate 20 so that pipes 16A and 18A communicate with chambers 62 and 64, respectively.

Figure 5:
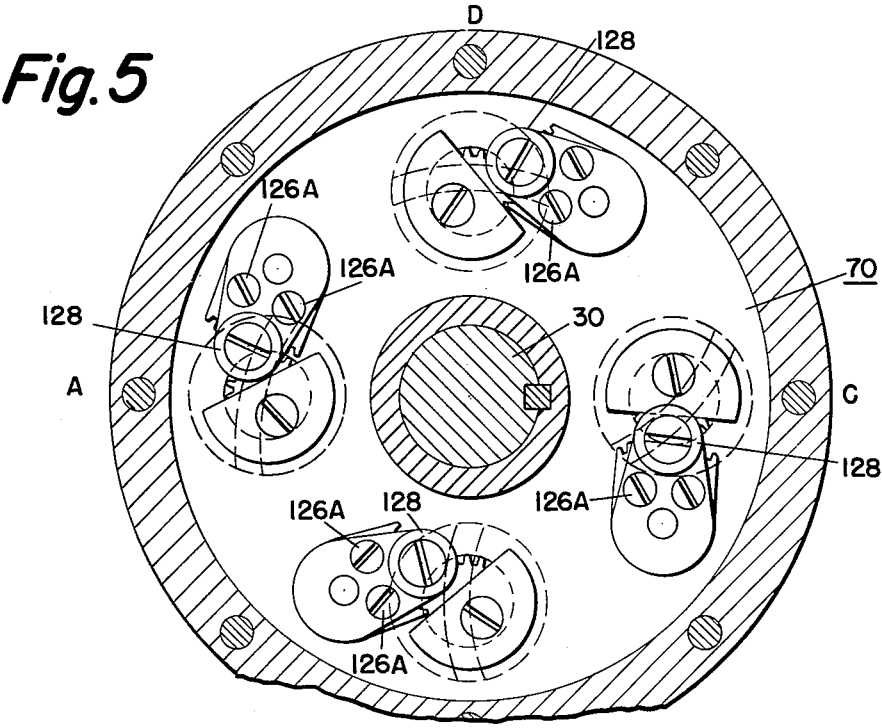
Figure 5 is a transverse cross-sectional view substantially on line 5—5 of Figure 1 illustrating the cam follower mechanism.

Referring to Figures 4, 5 and 6, the operation of the motor will now be described. In Figure 4 the rotation of the rotor 70 appears clockwise and the four impeller blades 104 are shown in the four significant positions which each assumes in one complete revolution of the rotor shaft 30.

At position A, which is in the region of the input chamber 62, the impeller blade 104 is in a substantially neutral position. It is shown slightly out of alignment with the fully neutral arcuate flanges 94 adjacent it, indicating a counterclockwise rotation thereof. This momentary position is produced by the related position of the cam follower 128 as shown in Figure 5.

The rotation of the impeller blade is caused by the gradual change in the radius of the cam track 140A about the axis of rotation of the rotor 70, as shown in Figure 6.

It should be noted that Figures 5 and 6 are sections taken in the opposite direction to that of Figure 4 and consequently all positions nad rotational directions appear reversed.

At position B in Figure 4, the impeller blade 104 has rotated 90 degrees, an imaginary plane of its width being radial with respect to the axis of rotation of the rotor 70. In practice it assumes this position upon entering the passageway 60B bounded by the projections 60 and 60A of the member 50 and the rotor housing 10, respectively, and maintains this radial position throughout said passageway. This is due to the circular, axially concentric path of the cam track 140A through this zone having a reduced radius from that shown at position A, as seen in Figure 6.

The edges of the impeller blade 104 are close fitting with the said projections 60 and 60A through this zone, thus sealing off the inlet chamber 62 from output chamber 64 and pushing before it all the fluid entrapped from said chambers 62 to 64. Before it leaves the zone typified by position B, the succeeding impeller enters said passageway preventing any reversal of fluid direction.

After leaving the aforementioned pumping zone, the impeller blade 104 reverses its direction of rotation to a clockwise one, approaching once more the neutral position of the unchanging arcuate flanges 94.

Here the change is accomplished by the increasing radius of the cam track 140A.

The impeller blade assumes a fully neutral position before entering passageway 58B bounded by the limits of the projections 58 and 58A of the member 50 and the rotor housing 10, respectively.

It should be noted here that the impeller blade 104 and the arcuate flanges 94 form a substantially continuous rim while passing through the passageway 58B, as shown in position D. These arcuate flanges serve no purpose through positions A, B and C, but at least one is always in passageway 58B, thus effectively sealing off the chambers 62 and 64 so that fluid cannot leak back from chamber 64 through passageway 58B, but must proceed out port 18 to pipe 18A as desired.

It will be appreciated that the above described structure will function as a pump as well as a motor. Further, it will be readily apparent that the motor is readily reversed by supplying fluid through port 18 and discharging through port 16.

Figure 8:
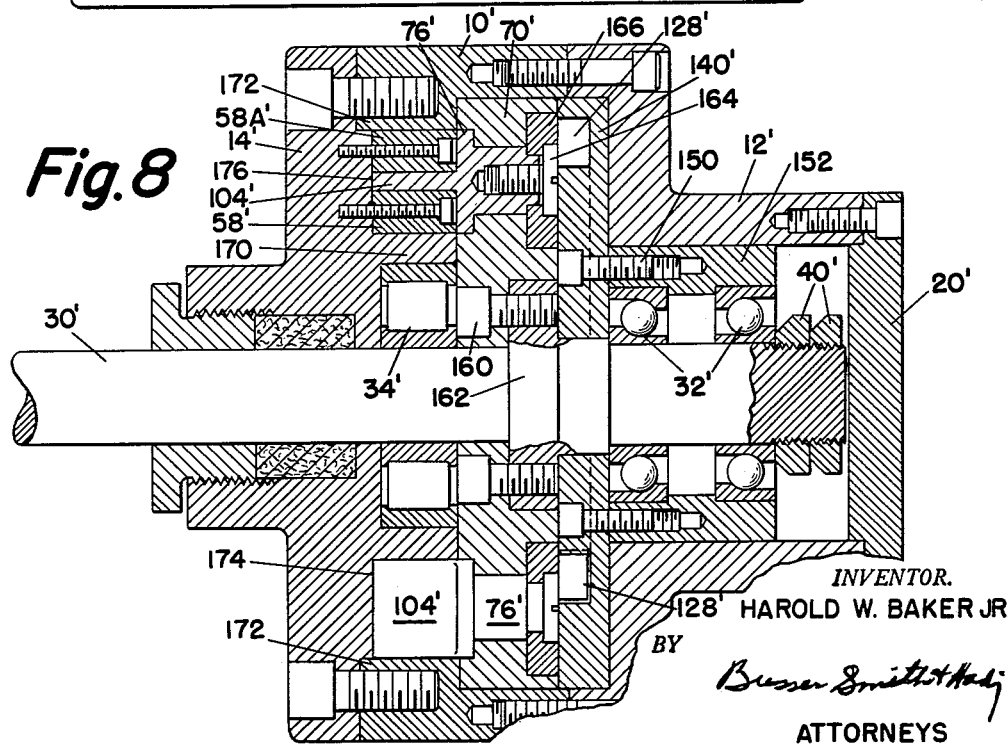
Figure 8 is a longitudinal cross-sectional view of the modified form of the invention, taken substantially on line 8—8 of Figure 7.

Figures 7 and 8 illustrate a modified construction wherein the impeller blades are adjusted directly without the use of gearing to produce the necessary 90 degrees of rotation. This modification also illustrates the use of a greater number of impeller blades, eight of them being shown.

While the device is described as a fluid motor, it should be understood that it will serve equally well as a pump.

Rotor housing 10', and bearing housings 12' and 14' form the motor casing and cover plate 20' seals the end of said casing.

A cam plate 140' is secured by any means such as screws 150 to a sleeve 152 in housing 12'. Within sleeve 152 is a pair of combination radial thrust bearings 32', in which rotor shaft 30' rotates. Lock nuts 40' secure shaft 30' in the bearings.

The rotor disc 70' is screw-fastened at 160 to a flange 162 on shaft 30', so that when the disc is rotated, as by a flow of fluid, shaft 30' is rotated with it. The impellers 76' are rotatably secured in rotor disc 70' by means of screws 164, which also serve to secure a disc 166 rigidly to the impeller 76'. The disc 166 has a cam follower roller 128' rotatably secured thereto.

A plurality of arcuate fins 94' project from the face of rotor disc 70' between each impeller blade 104'. The arcuate fins 94' and the impeller blades 104' have common radii and the sum of all their included angles totals 360 degrees so as to form a continuous rim when aligned.

It will be seen in Figure 8 that the bearing housing 14' is provided with a circular hub or boss 170, which is bored to receive the bearing 34'. The rotor housing 10% has an inwardly projecting lip 172, its inner surface being concentric about the hub 170 and forming an annular path 174 into which the impeller blades 104' and the fins 94' project.

A pair of arcuate blocks 58' and 58A' are secured to the inner face of the bearing housing 14'. These blocks project into the annular path 174 and between them is formed a relatively narrow, concentric passageway 176, through which the fins 94' and impeller blades 104' pass, preventing any short circuiting of the fluid.

Two openings 16' and 18' in rotor housing 10' communicate with the passageway 174, one on each side of the narrow passageway 176. These are the inlet and outlet ports, respectively. Pipes 16A' and 18A' are connected to these ports to conduct the driving fluid to and from the motor.

The operation of the motor is best understood with reference to Figure 7. Fluid under pressure is introduced at port 16', which can only flow through the annular passageway 174 in a counterclockwise direction pushing before it the impeller blades which have been positioned radial with respect to the axis of the rotor shaft 30'. This radial position is effected by the cam followers 128' in the track of cam 140'.

It will be seen that as the impeller blades 104' approach the region of the outlet port 18' the cam 140' rotates them, releasing the entrapped fluid for discharge.

The impeller blades continue to rotate until they align with the fins 94' and then pass through the narrow passageway 176, which effectively seals off the outlet port 18' from the inlet port 16'.

This cycle of operation is continuous causing the rotor shaft 30' to rotate in a counterclockwise direction so long as fluid under pressure is supplied at port 16'.

It is evident that the direction of rotation can be reversed by supplying fluid under pressure at port 18' and withdrawing fluid at port 16'.

It should be apparent also that by applying rotation to rotor shaft 30', as by any suitable motor, the device will pump fluid according to the direction of the rotation applied.

Applicant does not desire to be limited except as set forth in the following claims.

What is claimed is:

1. A motor comprising a hollow casing having an input and an outlet opening, said casing having in its interior a relatively narrow passageway and a relatively wide passageway connecting the input and outlet openings, a rotor, arcuate blades rotatably mounted on said rotor and projecting into said passageways, arcuate fins between said blades and fixedly secured to the rotor, said fins having a thickness substantially equal to the width of the relatively narrow passageway and each fin being spaced from its adjacent fins an arcuate distance less than the arcuate length of the relatively narrow passageway and said blades having a slightly smaller thickness than said fins and having a width substantially equal to the width of the relatively wide passageway, a fixed cam adjacent said rotor, cam follower means engaging said cam and connected to said blades respectively to position the blades to block the relatively wide passageway and to pass through the relatively narrow passageway, said blades and fins forming a substantially continuous ring section when passing through said relatively narrow passageway to provide substantially complete occupancy of said relatively narrow passageway.

2. A motor comprising a hollow casing having an input and an outlet opening, said casing having in its interior a relatively narrow arcuate passageway and a relatively wide arcuate passageway connecting the input and outlet openings, a rotor, arcuate blades rotatably mounted on said rotor and projecting into said passageways, arcuate fins between said blades and fixedly secured to the rotor, said fins having a thickness substantially equal to the width of the relatively narrow passageway and each fin being spaced from its adjacent fins an arcuate distance less than the arcuate length of the relatively narrow passageway and said blades having a slightly smaller thickness than said fins and having a width substantially equal to the width of the relatively wide passageway, a fixed cam adjacent said rotor, cam follower means engaging said cam and connected to said blades respectively to position the blades to block the relatively wide passageway and to pass through the relatively narrow passageway, said blades and fins forming a substantially continuous ring section when passing through said relatively narrow passageway to provide substantially complete occupancy of said relatively narrow passageway.

3. A motor comprising a hollow casing having an input and an outlet opening, said casing having in its interior a relatively narrow passageway and a relatively wide passageway connecting the input and outlet openings, a rotor, arcuate blades rotatably mounted on said rotor and projecting into said passageways, arcuate fins between said blades and fixedly secured to the rotor, said fins having a thickness substantially equal to the width of the relatively narrow passageway and each fin being spaced from its adjacent fins an arcuate distance less than the arcuate length of the relatively narrow passageway and said blades having a slightly smaller thickness than said fins and having a width substantially equal to the width of the relatively wide passageway, a fixed cam adjacent said rotor, cam follower means engaging said cam and connected to said blades respectively to position the blades to block the relatively wide passageway and to pass through the relatively narrow passageway, said cam follower means comprising cam followers pivotally secured on the rotor and operatively engaged with the cam and gear means connecting the cam followers to the cams respectively, said blades and fins forming a substantially continuous ring section when passing through said relatively narrow passageway to provide substantially complete occupancy of said relatively narrow passageway.

4. A motor comprising a hollow casing having an input and an outlet opening, said casing having in its interior a relatively narrow passageway and a relatively wide passageway connecting the input and outlet openings, a rotor arcuate blades rotatably mounted on said rotor and projecting into said passageways, the centers of the edges of each blade lying in a plane passing through their axis of rotation and each of said edges lying on an arc having the axis of rotation as a center, arcuate fins between said blades and fixedly secured to the rotor, said fins having a thickness substantially equal to the width of the relatively narrow passageway and each fin being spaced from its adjacent fins an arcuate distance less than the arcuate length of the relatively narrow passageway and said blades having a slightly smaller thickness than said fins and having a width substantially equal to the width of the relatively wide passageway, a fixed cam adjacent said rotor, cam follower means engaging said cam and connected to said blades respectively to position the blades to block the relatively wide passageway and to pass through the relatively narrow passageway, said blades and fins forming a substantially continuous ring section when passing through said relatively narrow passageway to provide substantially complete occupancy of said relatively narrow passageway.

5. A motor comprising a hollow casing having an input and an outlet opening, said casing having in its interior a relatively narrow passageway and a relatively wide passageway connecting the input and outlet openings, a rotor, arcuate blades rotatably mounted on said rotor and projecting into said passageways, the centers of the edges of each blade lying in a plane passing through their axis of rotation and the edges being arcuate with the axis of rotation as the center of the arc, arcuate fins between said blades and fixedly secured to the rotor, said fins having a thickness substantially equal to the width of the relatively narrow passageway and each fin being spaced from its adjacent fins an arcuate distance less than the arcuate length of the relatively narrow passageway and said blades having a slightly smaller thickness than said fins and having a width substantially equal to the width of the relatively wide passageway, a fixed cam adjacent said rotor, cam follower means engaging said cam and connected to said blades respectively to position the blades to block the relatively wide passageway and to pass through the relatively narrow passageway, said blades and fins forming a substantially continuous ring section when passing through said relatively narrow passageway to provide substantially complete occupancy of said relatively narrow passageway.

References Cited in the file of this patent

UNITED STATES PATENTS

| | | |
|---|---|---|
| 738,101 | Curtis | Sept. 1, 1903 |
| 1,262,164 | Bertsch | Apr. 9, 1918 |
| 1,728,029 | Barrett | Sept. 10, 1929 |

FOREIGN PATENTS

| | | |
|---|---|---|
| 614,326 | Great Britain | Dec. 14, 1948 |